(12) United States Patent
Levitan

(10) Patent No.: US 7,236,768 B2
(45) Date of Patent: Jun. 26, 2007

(54) SYSTEMS AND METHODS FOR A CARRIER-INDEPENDENT CALLING-PARTY-PAYS SYSTEM

(75) Inventor: Benjamin Charles Levitan, Raleigh, NC (US)

(73) Assignee: Nextel Communications, Inc., Overland Park, KS (US)

(*) Notice: Subject to any disclaimer, the term of this patent is extended or adjusted under 35 U.S.C. 154(b) by 227 days.

(21) Appl. No.: 10/901,502

(22) Filed: Jul. 27, 2004

(65) Prior Publication Data
US 2006/0025109 A1 Feb. 2, 2006

(51) Int. Cl.
*H04Q 7/20* (2006.01)

(52) U.S. Cl. .............. 455/406; 455/407; 455/408; 379/114.01; 379/127.01

(58) Field of Classification Search ........... 455/405, 455/406, 407, 408, 412.2, 414.1, 445, 563, 455/403; 379/114.01, 114.21, 114.28, 115.01, 379/111, 126, 127.01, 144.02, 114.05
See application file for complete search history.

(56) References Cited

U.S. PATENT DOCUMENTS

| | | | |
|---|---|---|---|
| 6,556,818 B1 * | 4/2003 | Meehan | 455/406 |
| 6,871,062 B2 * | 3/2005 | Trop et al. | 455/406 |
| 6,879,244 B1 * | 4/2005 | Scalisi | 340/7.2 |
| 2003/0220098 A1 * | 11/2003 | Gruchala et al. | 455/414.1 |

* cited by examiner

*Primary Examiner*—Jean Gelin (57) ABSTRACT

Disclosed are systems and methods for providing a carrier-independent calling-party-pays system. In one embodiment, upon having a call routed to a mobile switching center from a calling party, the mobile switching center determines if the called party is a calling-party-pays (CPP) customer. Depending on whether the called party is a CPP customer or not, the mobile switching center may bill only the calling party, or both the calling party and the called party.

29 Claims, 6 Drawing Sheets

SYSTEMS AND METHODS FOR A CARRIER-INDEPENDENT CALLING-PARTY-PAYS SYSTEM

FIELD OF THE INVENTION

This invention relates generally to wireless communications systems, and in particular, to wireless communications systems in which calling parties pay the service carrier fees.

BACKGROUND OF THE INVENTION

Toll Free Service (known as "Freephone" in other countries or "800 service" in the U.S.) allows people to call a business and reverse the charges so that the business pays for the call. Traditionally, "900 service" (known as "Premium Rate Services" in most other countries) allows a business to charge the calling party a premium price for placing a call to it. The business proposes that they have a good/service that can be delivered via telephone and offer the good/service to its clients in exchange for the client being billed directly on their telephone bill as a convenience to the customer. For example, suppose a business offers to provide car dealer's actual cost information by recorded message for the price of $9 if you call their 900 number anytime 24 hours a day. In this case, the caller will be billed $9 (a price set by the owner of the 900 number) for the call, after which there will be a revenue share between the provider of the 900-service platform and the owner of the 900 number (i.e., the business offering the good/service).

With the notable exception of North America, the standard method for billing cellular telephone calls is calling-party-pays (CPP). CPP refers to a billing arrangement in which a cellular subscriber may receive a call, and have the calling party pay the service charges so that, as with traditional landline services, the call is free for the called party to receive.

It is believed that the CPP method of billing encourages mobile users to leave their cellular telephones turned on such that the ratio of incoming calls to outgoing calls is roughly 1:1. Currently, the split in non-CPP areas (e.g., North America) is closer to 4:1 in favor of outgoing calls. Research suggests that switching to a CPP-based system will not affect the number of outgoing calls, but will materially increase the number of incoming calls. CPP systems help protect cellular subscribers by putting control of their cellular fees in their own hands. Currently, cellular subscribers have little control over who calls them, and are charged for all incoming calls, even those directed to the wrong number. In addition, people who visit the United States from countries where the standard for wireless service is the CPP system are often unpleasantly surprised to find that they have been charged for calls directed to them, including the international calls from their home system to the United States.

Several methods have been made to implement a CPP system in North America. One such method for implementing a CPP system is what is referred to as "number block-based CPP." In this approach, landline carriers keep track of and bill for calls made by its CPP customers, which are segregated into separate number blocks, usually on the basis of a central office code. The landline CPP customers can dial a local number in their CPP central office code, which is then forwarded to the wireless carrier of the recipient. The call gets billed back to the caller by the landline provider since the caller is one of its customers. A portion of the proceeds is then forwarded to the wireless carrier. However, this approach, which has been successfully implemented in Europe, suffers from a number of drawbacks. First, the landline carrier can only bill its own customers. Calls from other carriers, including competing wireless and landline carriers, cannot be billed unless they have similar billing arrangements in place. Moreover, calls from outside the central office region cannot be billed due to the large size of the central office code database that would have to be maintained to recognize all potential CPP calls.

Although other approaches for implementing a CPP system have been introduced, they all suffer from significant drawbacks. It was widely believed that the only technical way to implement a CPP system in the United States is to have a nationwide standard, as was done with local number portability. At one point, the FCC requested that carriers implement a CPP system. However, the industry was not able to develop an acceptable standard. Accordingly, there is a need in the art for a system and method for providing a carrier-independent CPP system which overcomes such drawbacks.

SUMMARY OF THE INVENTION

Systems and methods for providing a carrier-independent CPP system are disclosed. In one embodiment, a method includes receiving a telephone call originating from a calling party directed to a called party and determining if the called party is a calling-party-pays customer. The method further includes billing the telephone call according to a first method if the called party is the calling-party-pays customer, or billing the telephone call according to a second method if the called party is not the calling-party pays customer.

Other aspects, features, and techniques of the invention will be apparent to one skilled in the relevant art in view of the following detailed description of the invention.

DETAILED DESCRIPTION OF THE EXEMPLARY EMBODIMENTS

One aspect of the invention is to provide a CPP system in which cellular subscribers can be reached using traditional cellular telephone numbers, but which are also assigned a premium-rate telephone number (e.g., a "900 number") that will cause callers, and not the cellular subscriber, to be charged for calls to the traditional cellular telephone numbers. With traditional 900 service, each 900 number is associated with a specific terminating phone number which can be a landline or wireless number.

Another aspect of the invention is to leverage the already existing "900" service in the United States to provide billing back to the calling party and to provide both revenue to the carrier and free incoming calls to the subscriber who chooses to have the calling party pay. In one embodiment, the system allows any carrier to have CPP subscribers and even allows a single subscriber of that carrier to opt for CPP service while others operate as conventional United States subscribers. This will allow international roamers to operate as they are accustom to while roaming in the United States. Roaming agreements between US and International carriers will permit this type of set up.

Figure 1:
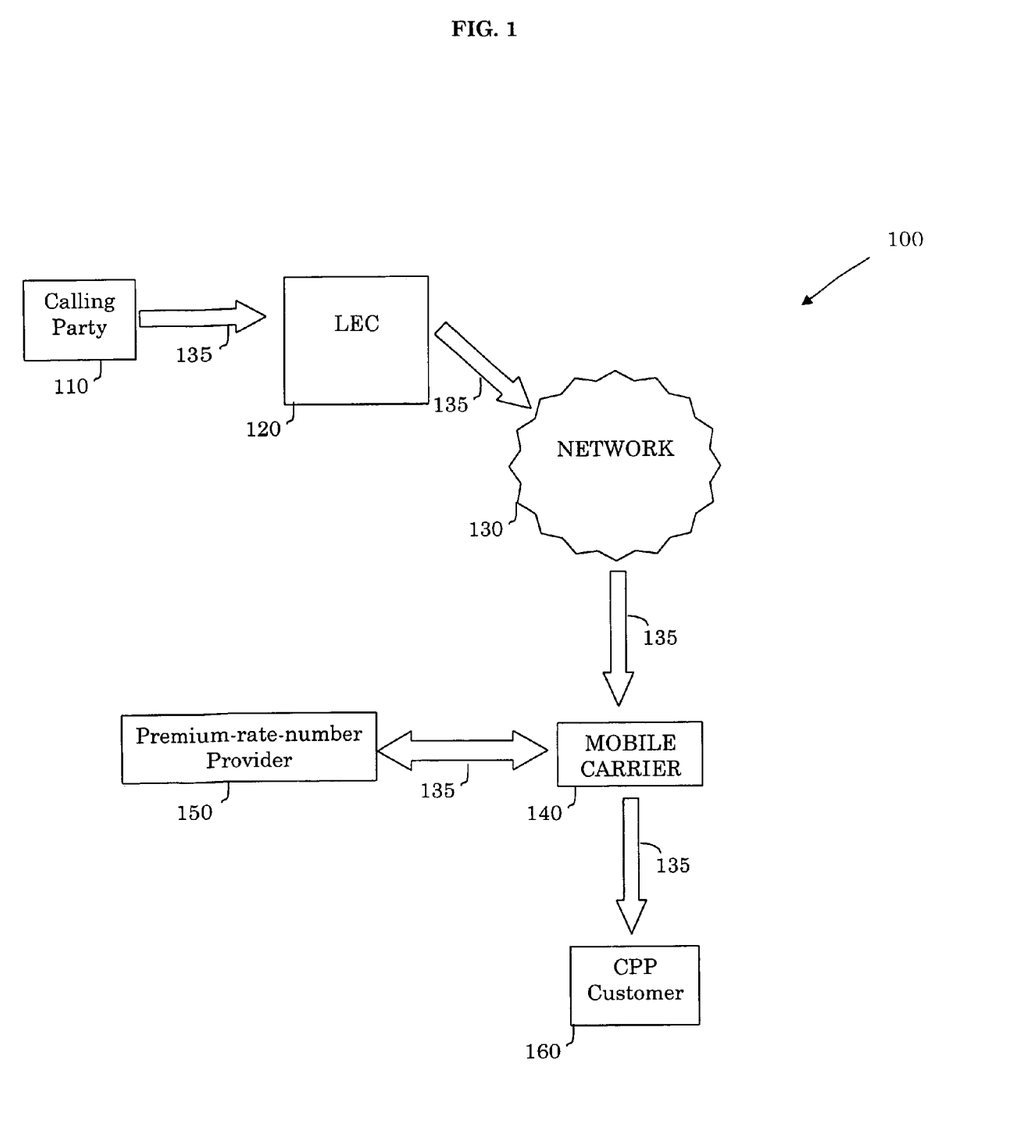
FIG. 1 illustrates a block diagram of an exemplary cellular communications system in accordance with an embodiment of the invention.

FIG. 1 illustrates a block diagram of an exemplary CPP communications system 100 in accordance with an embodiment. The CPP communications system 100 of FIG. 1 includes a calling party 110, the calling party's local exchange carrier (LEC) 120 and a public switched telephone network (PSTN) 130. In this embodiment, the calling party 110 is a landline customer and the CPP customer 160 is a cellular customer, although it should equally be appreciated that the calling party 110 may also be a cellular customer that connects to the PSTN 130 through its mobile switching center.

Continuing to refer to FIG. 1, to place a call to a CPP customer 160, the calling party 110 dials the CPP customer's cellular telephone number. In one embodiment, this call 135 will then be routed to the PSTN 130 via the LEC 120. The LEC 120 is the first telephone switch the calling party 110 will reach, and is typically associated with the calling party's 110 local service provider. In one embodiment, using the telephone number of the call 135, the LEC 120 may then use a routing tables (published to carriers as the LERG) to determine which carrier the call 135 should be forwarded to via the PSTN 130. In the embodiment of FIG. 1, the call 135 is forwarded to the appropriate mobile carrier 140, which in turn uses a home location register (HLR) to look up the CPP customer's subscriber record. The HLR database contains information about all of the mobile carrier's subscribers, service status, the features selected by those subscribers, as well as their last known location.

Based on this lookup operation, the mobile carrier 140 will determine that the call 135 is intended for a CPP customer, which will cause the mobile carrier's 140 mobile switching center (MSC) to send the call 135 to the appropriate premium-rate-number provider 150. The MSC is the home (or visited) telephone switch that the called party is connected to through a local base station (not shown).

In one embodiment, prior to sending the call to the appropriate premium-rate-number provider 150, the MSC may convert the CPP customer's 160 number to a unique premium-rate-number with the caller as the calling/billed party. The call 135 may then be routed to the premium-rate-number provider 150, along with the calling party's 110 number. The premium-rate-number platform may be functionally part of the carrier's system, and there would of course be no need to send the call out to the premium-rate-number provider 150. However, the following description assumes that the premium-rate-number provider 150 is separate from the mobile carrier 140. Moreover, while in one embodiment the premium-rate-number is a "900 number," it should equally be appreciated that other premium-rate-number designations may be used and/or adopted and still be consistent with the principles of the invention.

Once the premium-rate-number provider 150 receives the call 135, it may then map the CPP customer's 160 number to a particular interactive voice response (IVR) message. The IVR message may then notify the calling party 110 of the charges that will be imposed, after which time the calling party 110 may be given the opportunity to end the call and not be charged. It should equally be appreciated that the calling party 110 may opt to accept or decline charges using a number of different methods, including entering one or more digits on their telephone, using voice response, etc.

It should also be noticed that each individual CCP IVR may be customized or personalized both in terms of the announcements that are provided to the caller and the rates that are charged to the caller. Further, a list of authorized users could be allowed to bypass the IVR completely based on their calling parties' phone number.

As another option for CPP, the CPP subscriber may temporarily remove CPP via the use of a feature code (or similar method) to discontinue use of CPP or toggle CPP "on" for a one-time use if they are not normally a CPP subscriber. In one embodiment, this may or may not be permitted by the carrier.

Assuming that the calling party 110 has chosen to accept the charges, the premium-rate-number provider 150 will then return the call 135 back to the mobile carrier's 140 MSC. In one embodiment, the calling party's 110 number will be shown as the caller ID to the CPP customer 160. In another embodiment, the premium rate number may be shown as the caller ID to the CPP customer 160. The mobile carrier 140 may then complete the call to the CPP customer 160.

It should further be appreciated that one or both of the premium-rate-number provider 150 and the mobile carrier 140 may generate a bill for the call 135. This may be used to provide an audit system for the premium-rate-number provider 150 to settle call charges with the mobile carrier 140 since the two parties can cross-reference CPP charges with their internal records.

Figure 2:
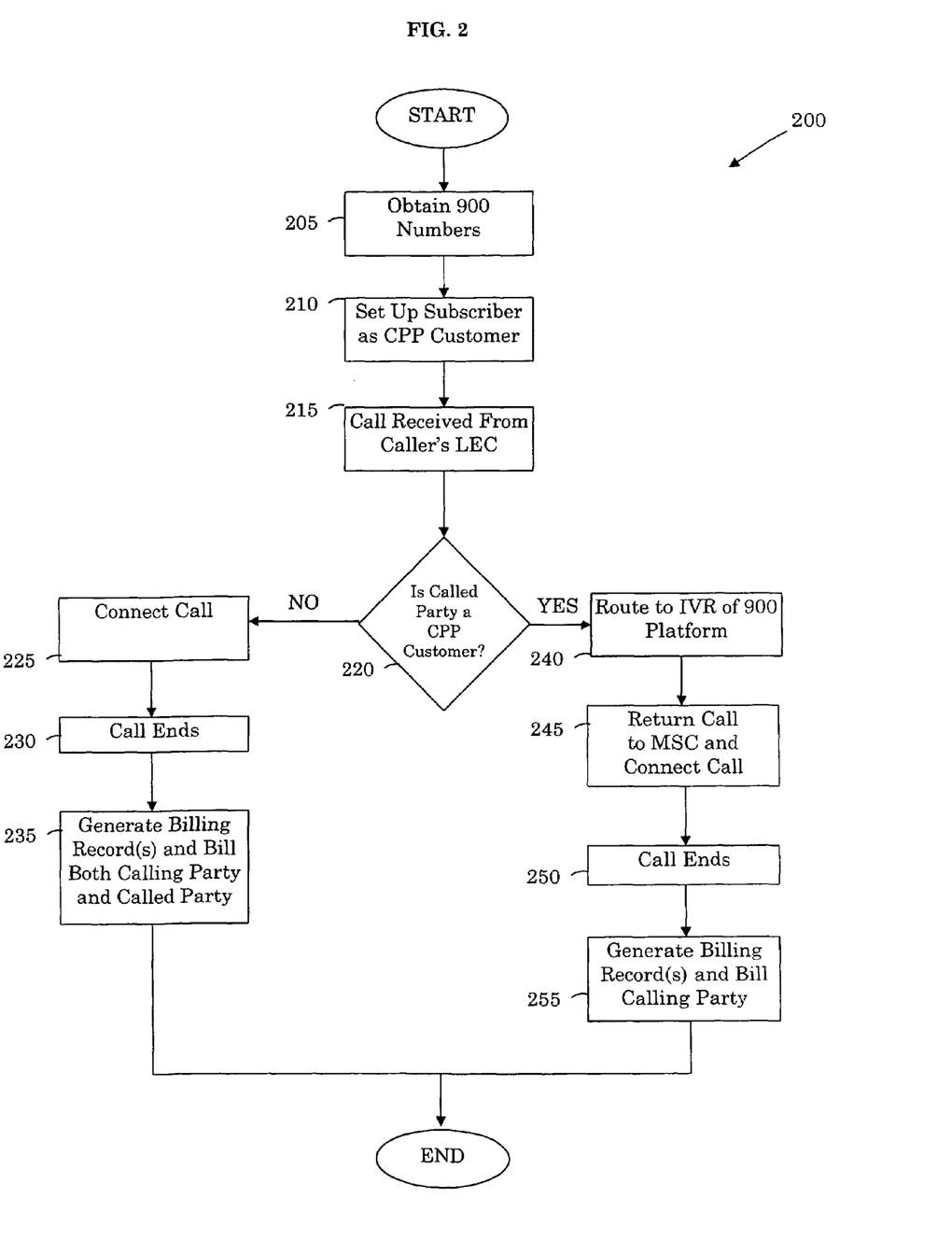
FIG. 2 illustrates a flow diagram of a process for carrying out one or more aspects of the invention in accordance with one embodiment of the invention.

FIG. 2 is one embodiment of a flow diagram for a process of implementing a CPP protocol in a carrier-independent system which uses existing "900 number" services as premium-rate-number providers. Process 200 begins at block 205 with a mobile carrier (e.g., mobile carrier 140) obtaining a single 900 number for each subscriber requesting that it be a CPP customer (e.g., CPP customer 160). The mobile carrier may then elect to register those requesting subscribers as CPP customers at block 210, after which time all incoming calls for those subscribers will be routed to an IVR of a 900 platform (e.g., premium-rate-number provider 150).

In a simplified system, it should be appreciated that a CPP subscriber may provide it's assigned premium-rate number (e.g., a 900 number) to callers that are to be treated as paying callers, while the CPP subscriber may similarly provide its dialable phone number (a non-premium-rate number) to other callers, which are not to be charged for the call to the subscriber. This would provide a simple form of CPP.

At block 215, a call may then be received by the MSC/mobile carrier from a calling party (e.g., calling party 110). It should be appreciated that the call may have been routed through the calling party's LEC (e.g., LEC 120) and PSTN (e.g., PSTN 130). Regardless of the manner in which the call is routed to the called party's MSC, at decision block 220 the MSC may make a determination as to whether the called party has registered as a CPP customer. In one embodiment, this operation may be accomplished by performing an HLR lookup for the called parties' features.

In the case where it is determined that the called party is not a CPP customer, process 200 continues to block 225 where the call is simply completed to the called party in the normal course. Once the call ends at block 230, one or more billing records can be generated by the called party's MSC and/or the calling party's LEC. Based on the billing records generated and their respective calling plans, both the calling party and the called party may then be billed for the call at block 235, as is customary in North America.

If, on the other hand, it is determined at block 220 that the called party is in fact a CPP customer, then process 200 moves to block 240 where the call is routed to an IVR of a 900 platform with the calling party's number shown as the caller. At this point, the platform will play an IVR message for the calling party indicating that the called party is a CPP customer, that a charge will apply to the call, and that the calling party has the option to avoid the charge by hanging up the phone, entering one or more specific digits, providing an audible voice response or other acceptable IVR mechanisms. In one embodiment, rates announced may be based on the known current location of the CPP customer. By way of a non-limiting example, the calling party may be presented with a message which says: "Welcome. The subscriber you are calling is a calling party pays customer. If you want to connect to this subscriber you will be charged 25 cents per minute. To accept press 1. To leave a voice mail at no charge for this subscriber press 2. To exit this call simply hang up within 5 seconds and you will not be charged." It should be appreciated that any number of variations on the IVR message may be used, and it should further be appreciated that the charges may be based on whether the called party is roaming, is out of the country or the like. In another embodiment, the caller may be provided with the opportunity to enter an authorization code that will cause the call to be connected without imposing a charge on the caller. The calling party may also grant known callers with bypass privileges, such at pressing the star button to interrupt the IVR followed by the input of a PIN or other identifier. This may be advantageous when a CPP customer desires to exempt only particular callers from being charged for calls to the CPP customer.

Assuming the caller agrees to the charges (which may differ depending on whether the called party is roaming or not), process 200 will continue to block 245 at which point the call is returned to the mobile carrier by the 900 platform. Having received a non-terminated call back from the 900 platform, the MSC may proceed to connect the call to the CPP customer. In one embodiment, the mobile carrier is able to automatically connect all non-terminated calls returned by the 900 platform since only calls by callers that agree to the CPP charges will be returned to the carrier by the 900 platform.

In another embodiment, or in addition to the previous embodiments, the call may be returned by the 900 platform to the mobile carrier with a caller ID of the calling party. After the call ends at block 250, one or more billing records can be generated by the called party's MSC, the calling party's LEC and/or the 900 platform (block 255). Based on these billing records, the calling party may then be billed for the call at block 255. In another embodiment, or in addition to the previous embodiments, the mobile carrier, having created a billing record for the outbound 900 call as well as the inbound call to the CPP subscriber, can match its records against the 900 platform to provide an effective auditing system. It should be noted that if a mobile subscriber is roaming, additional billing records may be generated for clearing and billing.

Figure 3:
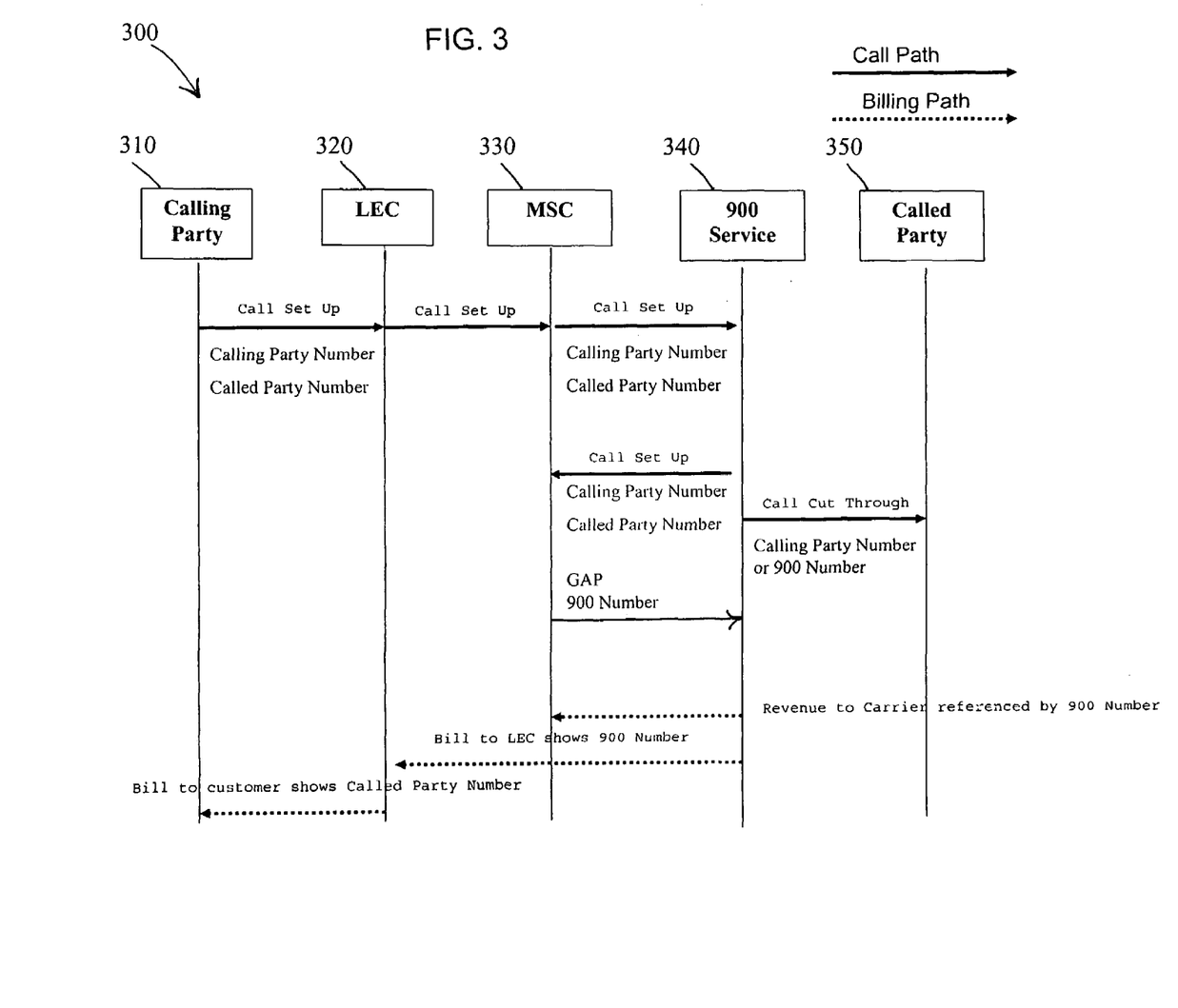
FIG. 3 illustrates one embodiment of the relationship and interaction between the individual components of the system of FIG. 1.

FIG. 3 depicts one embodiment of the billing and call routing arrangement 300 of a CPP system in which one 900 number is assigned to each CPP customer. In this embodiment, the calling party 310 places a call to a called party 350 and in the process provides both a calling party number and a called party number to LEC 320. As previously discussed, after performing a lookup for the called party's service provider, the call is forwarded by the LEC to the appropriate mobile carrier's MSC 330 via the PSTN (not shown). Moreover, after the MSC 330 determines that the called party 350 is a CPP customer, the call may be forwarded to the 900 platform 340, along with the calling party number and the corresponding 900 number. In turn, the 900 platform 340 returns the call to the MSC 330 with the calling party number, the called party number and the 900 number as the general address parameter (GAP), according to one embodiment. The GAP is a standard part of the standard telephone messaging and permits additional information about a call to be passed along. In this embodiment, the 900 number is provided with the call as reference.

As will be described in more detail below with reference to FIG. 4, in the embodiment of FIG. 3 the 900 platform 340 may generate a bill to the LEC 320 showing which 900 number was used and when. In turn, the calling party 310 may then be billed for the call by the LEC 320. Revenue from the call can then be shared between the 900 platform 340 and the mobile carrier 330 according to a predetermined sharing arrangement.

Figure 4:
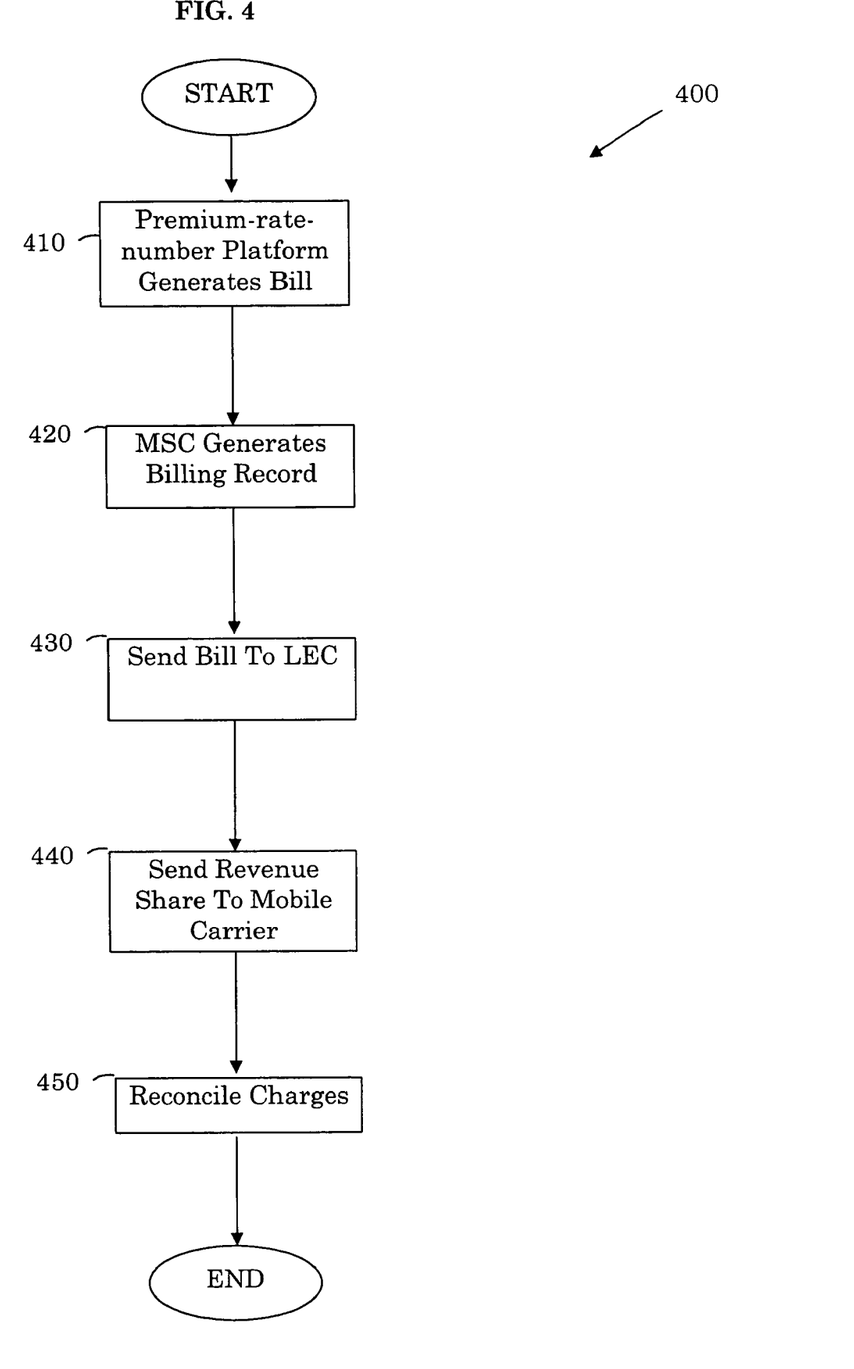
FIG. 4 is one embodiment of a flow diagram of a billing arrangement in accordance with the principles of the invention.

FIG. 4 depicts one embodiment for the billing process of a CPP call. In this embodiment, the billing process 400 begins after a call has been completed. In particular, at block 410 the premium-rate-number platform (e.g., 900 platform 340) generates a bill with both the calling party's number and the premium-rate number that was used. In one embodiment, this bill includes the time of the call, the actual premium-rate number used to call the called party, as well as the calling party's and called party's telephone numbers. Similarly, at block 420 the MSC (e.g., MSC 330) generates a billing record that is saved to the billing system. In one embodiment, this billing record includes the time of the call, the called party and the premium-rate number used. According to the present embodiment, a bill is sent to the LEC at block 430. As previously mentioned, the calling party may be billed for the call directly by its LEC. Revenue from the call can then be shared between the premium-rate-number platform and the mobile carrier according to a predetermined sharing arrangement (block 440). Charges can be audited at block 450 by comparing the bill generated by the premium-rate-number platform and the billing record generated by the MSC. It should be appreciated that the operations carried out in the process 400 of FIG. 4 may be carried out in a different order, or with one or more of the operations carried out in parallel.

Figure 5:
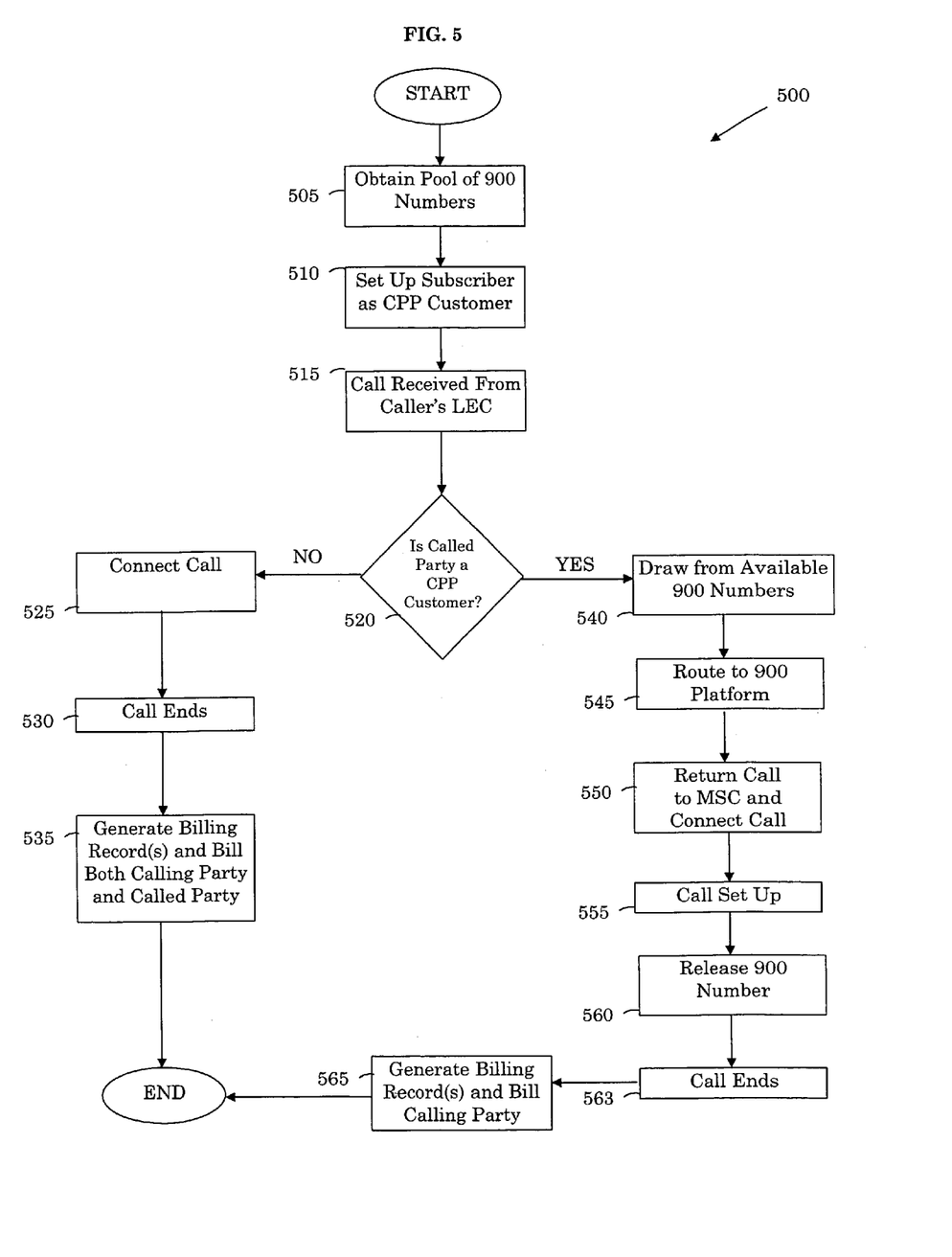
FIG. 5 illustrates a flow diagram of the process of FIG. 2 in accordance with another embodiment of the invention.

In contrast to FIG. 2, FIG. 5 depicts one embodiment of a flow diagram for the situation where, rather than assigning a unique 900 number to each CPP customer, 900 numbers are used as temporary location directory numbers (TLDNs). Since CPP customers will not need to use their 900 number all the time, it may be cost effective to have fewer 900 numbers than CPP customers. As previously mentioned, premium-rate numbers other than 900 numbers may similarly be used.

Process 500 begins at block 505 with the mobile carrier obtaining or securing a pool of 900 numbers that will be made available for CPP use. In one embodiment, the pool of available 900 numbers includes approximately 1 number for each 100 subscribers who elect to be CPP customers. Of course it should equally be appreciated that the ratio of 900 numbers to CPP customers may be any ratio less than 1:1.

It should similarly be appreciated that 900 numbers are but one embodiment of the type of premium-rate numbers that may be used.

At block 510, the mobile carrier may set up subscribers who have requested to be CPP customers. In one embodiment, the HLR record associated with the subscriber simply shows CPP as a feature for which the subscriber is authorized. It should further be appreciated that the pool of 900 numbers may be obtained after, or in parallel with, the registering of CPP customers. In one embodiment, the pool of available 900 numbers may be dynamically adjusted as a function of the number of subscribers registering as CPP customers.

Regardless of the size or allocation of available 900 numbers, process 500 continues with block 515 where a call is received from the calling party's LEC. In one embodiment, the call is routed to the called party's MSC by the calling party's LEC. At decision block 520 the mobile carrier may then make a determination as to whether the called party is a CPP customer or not. As with process 200, this may be done by performing a HLR lookup for the called party, although other known methods may similarly be used.

If it is determined that the called party is not a CPP customer, process 500 will continue to block 525 where the call is simply connected to the called party. After the call ends at block 530, one or more billing records can be generated by the called party's MSC and/or the calling party's LEC (block 535). Based on the billing records generated and their respective calling plans, both the calling party and the called party will bear their own costs for the call, as is customary in North America.

If, on the other hand, it is determined at block 520 that the called party is in fact a CPP customer, then process 500 will continue to block 540 where one of the available 900 numbers is selected from the available pool and used as a TLDN for the call. At this point, the call may be routed to an IVR of the 900 platform (block 545) with the calling party's number shown as the calling party. Once the caller has agreed to the CPP charges, the call may then be returned to the mobile carrier by the 900 platform, and connected to the CPP customer (block 550). After the call is set up at block 555, the previously-assigned 900 number may be released back to the available pool of 900 numbers for use as a TLDN for the next CPP customer call (block 560).

Continuing to refer to FIG. 5, when the call ends at block 563, one or more billing records can be generated by the called party's MSC, the calling party's LEC and/or the 900 platform (block 565). Based on these billing records, the calling party may then be billed for the call (block 565). In another embodiment, or in addition to the previous embodiments, the mobile carrier, having created a billing record for the outbound 900 call as well as the inbound call to the CPP subscriber, can match its records against the 900 platform to provide an effective auditing system.

Figure 6:
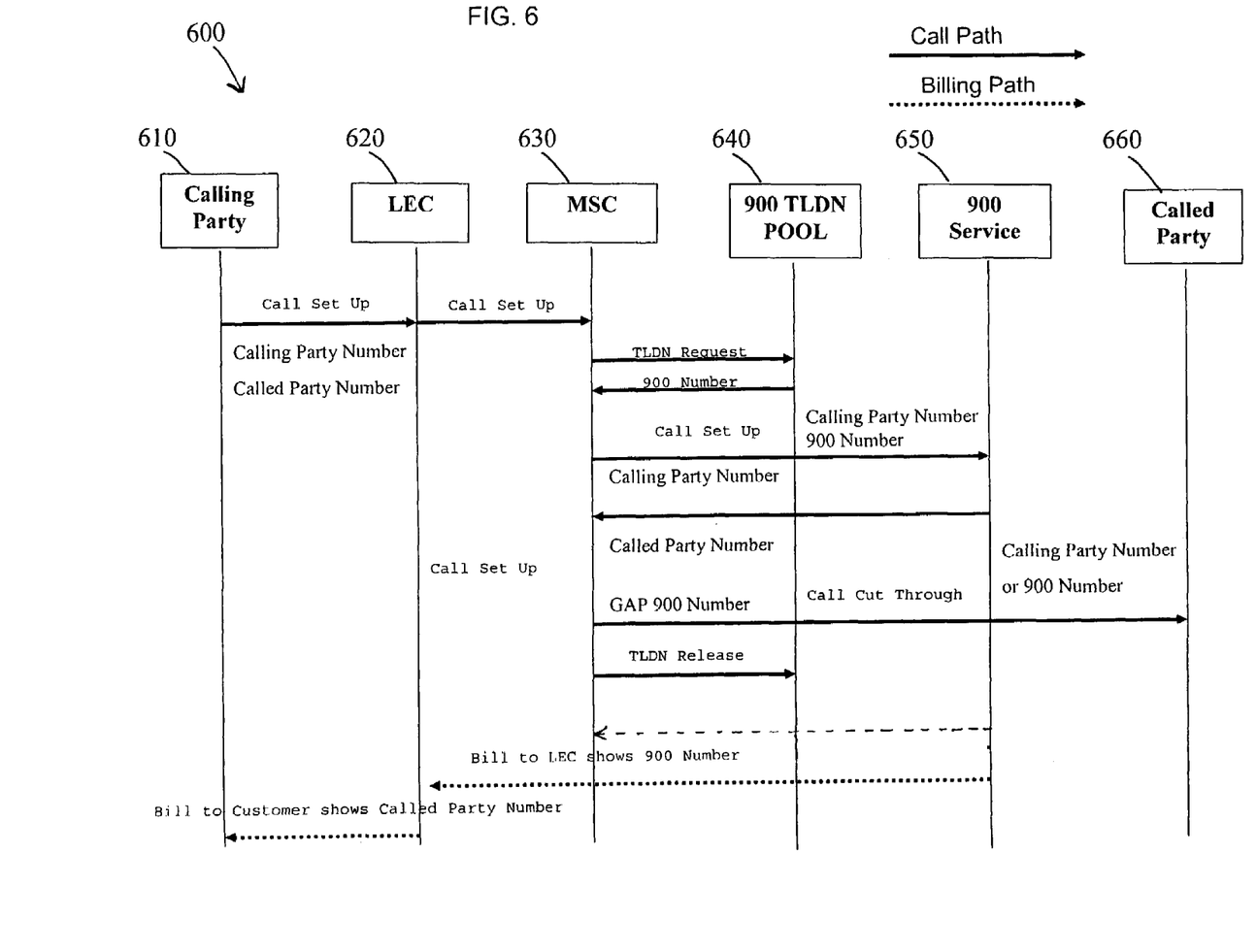
FIG. 6 illustrates another embodiment of the relationship and interaction between the individual components of the system of FIG. 1.

FIG. 6 depicts another embodiment of the billing and call routing arrangement 600 of a CPP system in which a pool of 900 numbers are used as TLDNs. In this embodiment, the calling party 610 places a call to a called party 660 and in the process provides both a calling party number and a called party number to LEC 620. As previously discussed, after performing a lookup for the called party number, the call is forwarded by the LEC 620 to the appropriate mobile carrier's MSC 630. Moreover, after the MSC 630 determines that the called party 660 is a CPP customer, a TLDN request may be issued to the 900 TLDN pool 640. After receiving a 900 number back from the 900 TLDN pool 640, the call may be forwarded to the 900 service 650, along with the calling party number and the selected 900 number. In turn, the 900 service 650 may return the call to the MSC 630 with the calling party number and the called party number.

Finally, the call then may be cut through to the called party 660, according to one embodiment. In another embodiment, or in addition to the previous embodiments, the calling party number or the 900 number may be shown as the caller ID to the called party. Alternatively, both may be shown to the called party to indicate to a called party who accepts both the CPP and non-CPP calls the status of this particular incoming call. In one embodiment, the 900 display may be used to indicate CPP, while no 900 display may indicate a non-CPP call. It should also be appreciated that any number of displays could be provided to provide information to the called party as to which type of call they are receiving including a direct display that will indicate "incoming CPP call" or "incoming non-CPP call." Moreover, once the call is complete the MSC 630 may release the 900 number back to the 900 TLDN pool 640.

As with the previously-described FIG. 3, when the call ends the 900 service 650 may generate a bill to the LEC 620 showing which 900 number was used and when. In turn, the calling party 610 may then be billed for the call by the LEC 620. Revenue from the call can then be shared between the 900 service 650 and the mobile carrier (MSC 630) according to a predetermined sharing arrangement.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method comprising:
    receiving a telephone call originating from a calling party directed to a called party using a non-premium-rate telephone number for the called party;
    determining if the called party is a calling-party-pays customer;
    associating, on a temporary basis, a premium-rate number with said called party in response to determining the called party is the calling party pays customer;
    billing the telephone call according to a first method if the called party is the calling party pays customer; and,
    billing the telephone call according to a second method if the called party is not the calling party pays customer.

2. The method of claim 1, wherein billing the telephone call according to the first method comprises billing only said calling party for the telephone call, and wherein billing the telephone call according to the second method comprises billing both the calling party and the called party for the telephone call.

3. The method of claim 1, wherein determining if the called party is the calling-party-pays customer comprises performing a home location register lookup using the non-premium-rate telephone number.

4. The method of claim 1, further comprising, when said called party is the calling-party-pays customer,
    routing the telephone call to a premium-rate-number platform;
    receiving an acceptance from the calling party to apply said first method of billing; and
    connecting the telephone call to said called party.

5. The method of claim 1, wherein associating the premium-rate number with said called party comprises:
   selecting the premium-rate number from a plurality of available premium-rate numbers, and
   assigning temporarily said premium-rate number to said called party for a limited duration of the telephone call.

6. The method of claim 4, further comprising, after said routing the telephone call to the premium-rate-number platform,
   playing an interactive voice response message for said calling party, and providing the calling party with an opportunity to not be charged for said telephone call.

7. The method of claim 6, wherein playing an interactive voice response comprises playing an interactive voice response for said calling party where at least one of said interactive voice response message and said first method of billing is customizable based on said calling party.

8. The method of claim 1, wherein said billing the telephone call according to said first method comprises:
   sending a bill for said telephone call to a local exchange carrier of said calling party; and
   sharing revenue collected from said local exchange carrier with a mobile switching center of said called party.

9. The method of claim 1, wherein said determining if the called party is a calling-party-pays customer comprises determining if the called party is a calling-party-pays customer based in part on at least one of a feature code set by the called party, an authorization code entered by the calling party and a bypass code entered by the calling party.

10. A system comprising:
   a mobile switching center in communication with a called party, wherein the mobile switching center:
   receives a telephone call originating from a calling party directed to the called party using a non-premium-rate telephone number for the called party,
   determines if the called party is a calling-party-pays customer,
   associates, on a temporary basis, a premium-rate number with said called party in response to determining that the called party is the calling-party-pays customer;
   bills the telephone call according to a first method if the called party is the calling-party-pays customer, and
   bills the telephone call according to a second method if the called party is not the calling-party pays customer.

11. The system of claim 10, wherein billing the first method comprises billing only said calling party for the telephone call, and wherein the second method comprises billing both the calling party and the called party for the telephone call.

12. The system of claim 10, wherein the mobile switching center determines if the called party is the calling-party-pays customer by performing a home location register lookup using the non-premium-rate telephone number of the called party.

13. The system of claim 11, when said called party is the calling-party-pays customer, said mobile switching center further,
   routes the telephone call to a premium-rate-number platform,
   receives an acceptance from the calling party to apply said first method of billing, and
   connects the telephone call to said called party.

14. The system of claim 10, wherein the mobile switching center associates the premium-rate number with said called party by,
   selecting the premium-rate number from a plurality of available premium-rate numbers, and
   assigning temporarily said premium-rate number to said called party for a limited duration of the telephone call.

15. The system of claim 10, wherein the premium-rate-number platform, after having the telephone call routed from the mobile switching center, plays an interactive voice response message for said called party, and provides the calling party with an opportunity to not be charged for said telephone call.

16. The system of claim 15, wherein at least one of the interactive voice response message and said first method of billing is customizable based on said calling party.

17. The system of claim 13, wherein the premium-rate-number platform sends a bill to a local exchange carrier of said calling party, and shares revenue collected from said local exchange carrier with said mobile switching center.

18. The system of claim 10, wherein said mobile switching center determines if the called party is a calling-party-pays customer based in part on at least one of a feature code set by the called party, an authorization code entered by the calling party and a bypass code entered by the calling party.

19. A computer readable medium including one or more software modules to control a processor to:
   receive a telephone call originating from a calling party directed to a called party using a non-premium-rate telephone number for the called party;
   determine if the called party is a calling-party-pays customer;
   associate, on a temporary basis, a premium-rate number with said called party in response to determining that the called party is the calling-party-pays customer;
   bill the telephone call according to a first method if the called party is the calling-party-pays customer; and,
   bill the telephone call according to a second method if the called party is not the calling-party pays customer.

20. The computer readable medium of claim 19, wherein billing the telephone call according to the first method comprises billing only said calling party for the telephone call, and wherein billing the telephone call according to the second method comprises billing both the calling party and the called party for the telephone call.

21. The computer readable medium of claim 19, wherein determining if the called party is the calling-party-pays customer comprises performing a home location register lookup using the non-premium-rate telephone number.

22. The computer readable medium of claim 19, further comprising, when said called party is the calling-party-pays customer, one or more software module to:
   route the telephone call to a premium-rate-number platform;
   receive an acceptance from the calling party to apply said first method of billing; and
   connect the telephone call to said called party.

23. The computer readable medium of claim 19, wherein the one or more software modules to associate the premium-rate number with said called party comprises one or more software modules to:
   select the premium-rate number from a plurality of available premium-rate numbers, and
   assign temporarily said premium-rate number to said called party for a limited duration of the telephone call.

24. The computer readable medium of claim 22, further comprising one or more software modules to, after the telephone call is routed to the premium-rate-number platform,
   play an interactive voice response message for said calling party, and
   provide the calling party with an opportunity to not be charged for said telephone call.

25. The computer readable medium of claim 24, wherein said one or more software modules to play the interactive voice response message comprises one or more software modules to play the interactive voice response message for said calling party where at least one of the interactive voice response message and said first method of billing is customizable based on said calling party.

26. The computer readable medium of claim 19, wherein the one or more software modules to bill the telephone call according to said first method comprises one or more software modules to:
  send a bill for said telephone call to a local exchange carrier of said calling party; and
  share revenue collected from said local exchange carrier with a mobile switching center of said called party.

27. A method comprising the acts of:
  receiving a telephone call request originating from a calling party directed to a calling-party-pays customer using a non-premium-rate telephone number;
  associating, on a temporary basis, a premium-rate number with the calling-party-pays customer, wherein the premium-rate number is unknown to the calling party;
  routing the telephone call to a premium-rate-number platform;
  receiving an indication that the calling party is willing to pay for the telephone call; and
  connecting the telephone call to the calling-party-pays customer.

28. The method of claim 27, wherein associating the premium-rate number with calling-party-pays customer comprises:
  selecting the premium-rate number from a plurality of available premium-rate numbers, and
  assigning temporarily said premium-rate number to said calling-party-pays customer for a limited duration of the telephone call.

29. The method of claim 27, further comprising sending a bill for said telephone call to a local exchange carrier of said calling party, and sharing revenue collected from said local exchange carrier with a mobile switching center of said calling-party-pays customer.

* * * * *